(12) United States Patent
Yamada et al.

(10) Patent No.: US 7,565,133 B2
(45) Date of Patent: Jul. 21, 2009

(54) COMMUNICATION TERMINAL AND PROGRAM USING A PACKET SWITCHED COMMUNICATION LINE AND A CIRCUIT SWITCHED COMMUNICATION LINE

(75) Inventors: Kazuhiro Yamada, Yokohama (JP); Yoshiaki Hiramatsu, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 44 days.

(21) Appl. No.: 11/009,750

(22) Filed: Dec. 10, 2004

(65) Prior Publication Data

US 2005/0128959 A1   Jun. 16, 2005

(30) Foreign Application Priority Data

Dec. 10, 2003   (JP)   ............... 2003-412430

(51) Int. Cl.
 *H04W 4/26*   (2009.01)
(52) U.S. Cl. .................. 455/405; 370/328; 370/352
(58) Field of Classification Search .......... 455/405–408
See application file for complete search history.

(56) References Cited

U.S. PATENT DOCUMENTS

| | | | |
|---|---|---|---|
| 5,907,604 A | 5/1999 | Hsu | 379/142.06 |
| 6,405,060 B1 | 6/2002 | Schroeder et al. | 455/566 |
| 6,408,174 B1 * | 6/2002 | Steijer | 455/407 |
| 6,999,499 B1 * | 2/2006 | Park | 375/142 |
| 2002/0198021 A1 | 12/2002 | Boesen | 455/556.1 |
| 2004/0203657 A1 * | 10/2004 | Koskelainen | 455/414.1 |

FOREIGN PATENT DOCUMENTS

| | | |
|---|---|---|
| EP | 0 642 252 B1 | 1/2002 |
| JP | H07-066905 | 3/1995 |
| JP | 2000-013866 | 1/2000 |
| JP | 2003-125451 | 4/2003 |
| JP | 2003-198600 A | 7/2003 |
| JP | 2003-235076 | 8/2003 |
| WO | WO 03/096140 | 11/2003 |

OTHER PUBLICATIONS

EP Search Report dated Jul. 4, 2006.
European Examination Report, EP App. No. 04 029 219.5, Sep. 15, 2006.
Office Action issued by Japanese Patent Office for Japanese Patent Application No. 2003-412430 (Translation included).
Japanese Office Action issued Oct. 21, 2008 in Japanese patent application No. 2003-412430 (with translation).
Chinese Office Action issued Aug. 1, 2008 in Chinese application No. 200410098629.0 (with partial translation).

* cited by examiner

*Primary Examiner*—Philip J Sobutka
(74) *Attorney, Agent, or Firm*—Brinks Hofer Gilson & Lione

(57) ABSTRACT

To enable a user of a communication terminal to note that the terminal has received data by data communication conducted in the background of a voice communication, easily and in the required time. After establishing a voice communication line between mobile phone 100-2, mobile phone 100-1 establishes a data communication line with mobile phone 100-2 and acquires image data. When disconnecting a voice communication line, mobile phone 100-1 produces a notification sound and displays the acquired image data, thereby notifying a user of mobile phone 100-1 of acquiring data by data communication during voice communication.

19 Claims, 8 Drawing Sheets

FIG. 2

| TELEPHONE NUMBER | IP ADDRESS |
|---|---|
| 0*0-XXXX-XXXX | xxx.xxx.xxx.xxx |
| 0*0-YYYY-YYYY | yyy.yyy.yyy.yyy |

| TELEPHONE NUMBER | COMMUNICATION FEES |
|---|---|
| 0*0-XXXX-XXXX | 550 YEN |
| 0*0-ZZZZ-ZZZZ | 2100 YEN |

TB2

| DATE AND TIME | TELEPHONE NUMBER | IMAGE DATA |
|---|---|---|
| 2002/10/24 11:15 | 0*0-ZZZZ-ZZZZ | zzz.jpg |
| 2002/10/25 10:00 | 0*0-YYYY-YYYY | aaa.jpg |

COMMUNICATION TERMINAL AND PROGRAM USING A PACKET SWITCHED COMMUNICATION LINE AND A CIRCUIT SWITCHED COMMUNICATION LINE

This application claims priority under 35 U.S.C. § 119 to Japanese Patent Application No. 2003-412430 filed Dec. 10, 2003, the entire content of which is hereby incorporated by reference.

TECHNICAL FIELD

The present invention relates to a technique; wherein, one communication terminal simultaneously performs voice communication and data communication.

RELATED ART

A technique is known, in which, at the background of a voice communication using a telephone line, data communication using the same line is performed (for example, refer to Japanese Patent Application Laid-Open Publication No. H7-66905; hereinafter, referred to as patent document 1). The technique allows sending/receiving of data between terminals that belong to each communicator without interrupting voice communication.

SUMMARY OF THE INVENTION

In a technique disclosed in patent document 1, a user of a communication terminal is not aware of data communication being performed. In case of sending data during voice communication, a user of a communication terminal which is the sending source of the voice communication is required to orally notify a user of a communication terminal, the sending destination, that "data is being sent in the background during voice communication", which is uncomfortable for users of both the communication terminals. To perform the notification, a user of a communication terminal which is the sending source has to be aware of the proceeding status of data communication performed at the background; in patent document 1, however, even the awareness of the proceeding status of data communication is difficult to presume.

The present invention has been presented under the above circumstances, and an aim of the invention is to provide a communication terminal and a program in which, a user of the communication terminal is able to know easily and within the required time that data is being received by data communication performed at the background of voice communication.

The present invention provides a communication terminal, comprising: communication line establishing means for establishing a communication line; data line establishing means for establishing a data communication line between a communication terminal and a connection point of a communication line established by the communication line establishing means while a communication line is established by the communication line establishing means; a data sending-receiving means for sending/receiving data using a data communication line established by the data line establishing means; and notification means for notifying that the data sending-receiving means sends and receives data.

The present invention also provides a communication terminal, comprising: communication line establishing means for establishing a communication line; data line establishing means for establishing a data communication line between an accounting server device storing information on charges for the use of a line established by the terminal while a communication line is established by the communication line establishing means; data sending-receiving means for acquiring information of the charges from the accounting server device using a data communication line established by the data line establishing means; notification means for notifying that the data sending-receiving means sends and receives data.

The present invention also provides a program for causing a computer to provide the functions of: communication line establishing means for establishing a communication line; data line establishing means for establishing a data communication line between a communication terminal, a connection point of a communication line established by the communication line establishing means while a communication line is established by the communication line establishing means; data sending-receiving means for sending/receiving data using a data communication line established by the data line establishing means; and notification means for notifying that the data sending-receiving means sends and receives data.

The present invention also provides a program for causing a computer to provide the functions of: communication line establishing means for establishing a communication line; data line establishing means for establishing a data communication line between an accounting server device storing information charges for the use of a line established by the terminal while a communication line is established by the communication line establishing means; data sending-receiving means for acquiring information of the charges from the accounting server device using a data communication line established by the data line establishing means; and notification means for notifying that the data sending-receiving means sends and receives data.

A communication terminal of the present invention enables a user of the communication terminal is able to know easily and within the required time that data is being received by data communication performed at the background of voice communication.

According to the present invention, while a voice communication line is established, a communication terminal establishes a data communication line between devices which is capable of data communication, and notifies to a user the communication terminal the sending/receiving of data using data communication line.

The present invention allows a user of a communication terminal to note that the terminal has received data by data communication conducted at the background of a voice communication, easily and within the required time.

BRIEF DESCRIPTION OF THE DRAWINGS

FIG. 2 is a diagram illustrating a format of an address management table stored in gateway relay grade switching device 204 according to the embodiment.

FIG. 3 is a diagram illustrating a format of accounting table TB2 stored in accounting server device 206 according to the embodiment.

PREFERRED EMBODIMENTS FOR CARRYING OUT THE INVENTION

Figure 1:
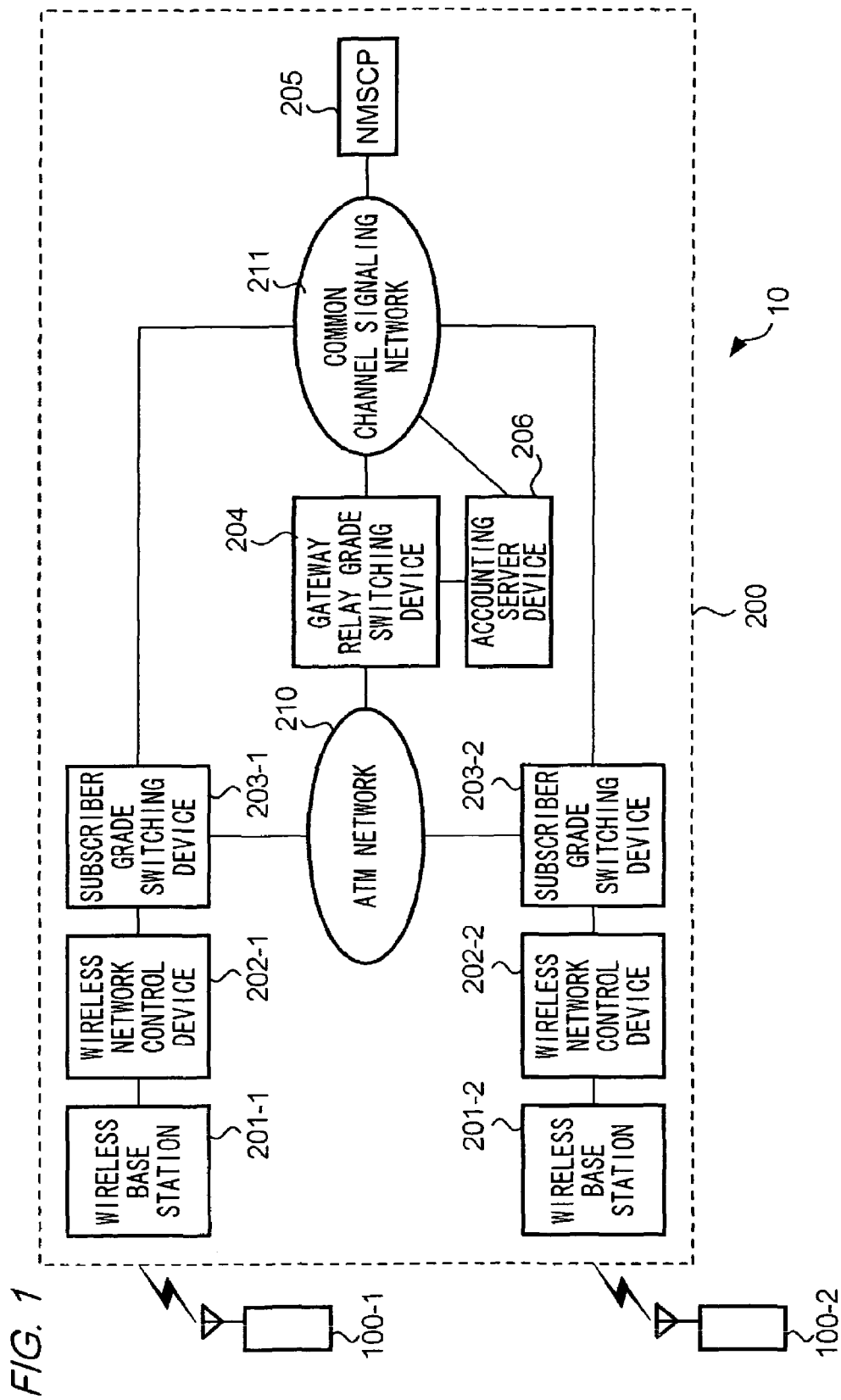
FIG. 1 is a diagram showing an overall configuration of communication system 10 according to an embodiment of the present invention.

Referring now to the drawings, embodiments of the present invention will be explained.

[1.] Configuration of Embodiment

[1-1]. Overall Configuration

FIG. 1 is a diagram showing an overall configuration of communication system 10 according to an embodiment of the present invention.

Mobile phone 100-1 and mobile phone 100-2 is a mobile phone conforming to IMT-2000 (International Mobile Telecommunication 2000). Mobile phone 100-1 and mobile phone 100-2 have the same configuration. Thus, unless each mobile phone is required to be differentiated, the mobile phones are referred to as mobile phone 100 in abbreviation. Mobile phone 100 is capable of controlling several wireless lines individually at once; the phone performs simultaneous communication of circuit switching calls for voice communication and packet switching calls for data communication by performing a call set and a call release for the wireless lines.

Mobile communication network 200 is a communication network conforming to IMT-2000; the network employs a communication method called W-CDMA (Wideband-Code Division Multiple Access) for communication performed between wireless base station 201 (later described) and mobile phone 100. Mobile communication network 200 provides a data communication service using packet communication, a communication service, and a multi-call service enabling the simultaneous communication of a voice switching call and a packet switching call for mobile phone 100 owned by a user who has signed a subscription contract with a communication carrier managing mobile communication network 200. Mobile communication network 200 comprises the devices explained below.

Wireless base station 201-1 and wireless base station 201-2 are connected to wireless network control device 202 to conduct wireless communication with mobile phone 100 located within wireless cells managed by the base station (Note that in the following description, unless each wireless base station is required to be differentiated, the base stations are referred to as wireless base station 201). In actuality, to provide a widespread communication area for mobile phone 100, a number of wireless base stations 201 are located within a communication service area; however, to avoid the figures from becoming overly complicated, only two wireless base stations are illustrated in FIG. 1.

Wireless network control device 202-1 and wireless network control device 202-2 are connected to subscriber grade switching device 203 to perform line connection control of wireless line and handover control by controlling a plurality of wireless base stations 201 connected to the device (Note that in the following description, unless each wireless network control device is required to be differentiated, the network control devices are referred to as wireless network control device 202). In actuality, a number of wireless network control devices 202 exist; however, to avoid the figures from becoming overly complicated, only two wireless network control devices are illustrated in FIG. 1.

Subscriber grade switching device 203-1 and subscriber grade switching device 203-2 have circuit switching function and packet switching function, and are connected to common channel signaling network 211 and ATM (Asynchronous Transfer Mode) network 210 (Note that in the following description, unless each subscriber grade switching device is required to be differentiated, the switching facilities are referred to as subscriber grade switching device 203).

ATM network 210 is a network that employs an asynchronous transfer mode as a transmission/switching method. ATM network 210 transmits or switches line switching data including voice communication and packet switching data including data communication by a fixed length data row of 53 bytes (ATM cell). Communication between subscriber grade switching device 203 and gateway relay grade switching device 204 is performed using asynchronous transfer mode. Common channel signaling network 211 is a communication network for transferring control signals sent and received between switching facilities for line connection and accounting signals for accounting.

Gateway relay grade switching device 204 is connected to ATM network 210 and common channel signaling network 211. Gateway relay grade switching device 204 has line switching function and packet switching function. When a mobile phone starts data communication, gateway relay grade switching device 204 dynamically gives an IP address to mobile phone 100 and stores the IP address in address management table TB1 in correspondence with a telephone number, as shown in FIG. 2.

NMSCP (New Mobile Service Control Point) 205 is connected to common channel signaling network 211 and stores information relating to a subscriber who has signed a subscription contract with a communication carrier managing mobile communication network 200 and location registration information of mobile phone 100). NMSCP 205 also charges each subscriber on the basis of accounting signals sent from subscriber grade switching device 203 connected to the common channel signaling network, calculates communication fees to be charged for the subscriber, and transmits data indicating the calculated communication fees to accounting server device 206 via common channel signaling network 211.

Accounting server device 206 is connected to gateway relay grade switching device 204 and common channel signaling network 211, and the configuration is the same as that of a typical server device. Accounting server device 206 receives from NMSCP 205 data indicating communication fees, stores for each subscriber communication fees to be charged for the subscriber, and manages the fees. Accounting server device 206 stores accounting table TB2 in a format illustrated in FIG. 3. Accounting table TB2 is a table for storing data indicating communication fees for communication by mobile phone 100. Accounting server device 206 is able to perform packet communication with mobile phone 100; and in response to the request from mobile phone 100, the server device having the functions of reading out from accounting table TB2 reads out communication fees data indicating the communication fees charged for the ongoing communication performed by mobile phone 100 and sending the data to mobile phone 100.

[Configuration of mobile phone]

Figures 4, 5:
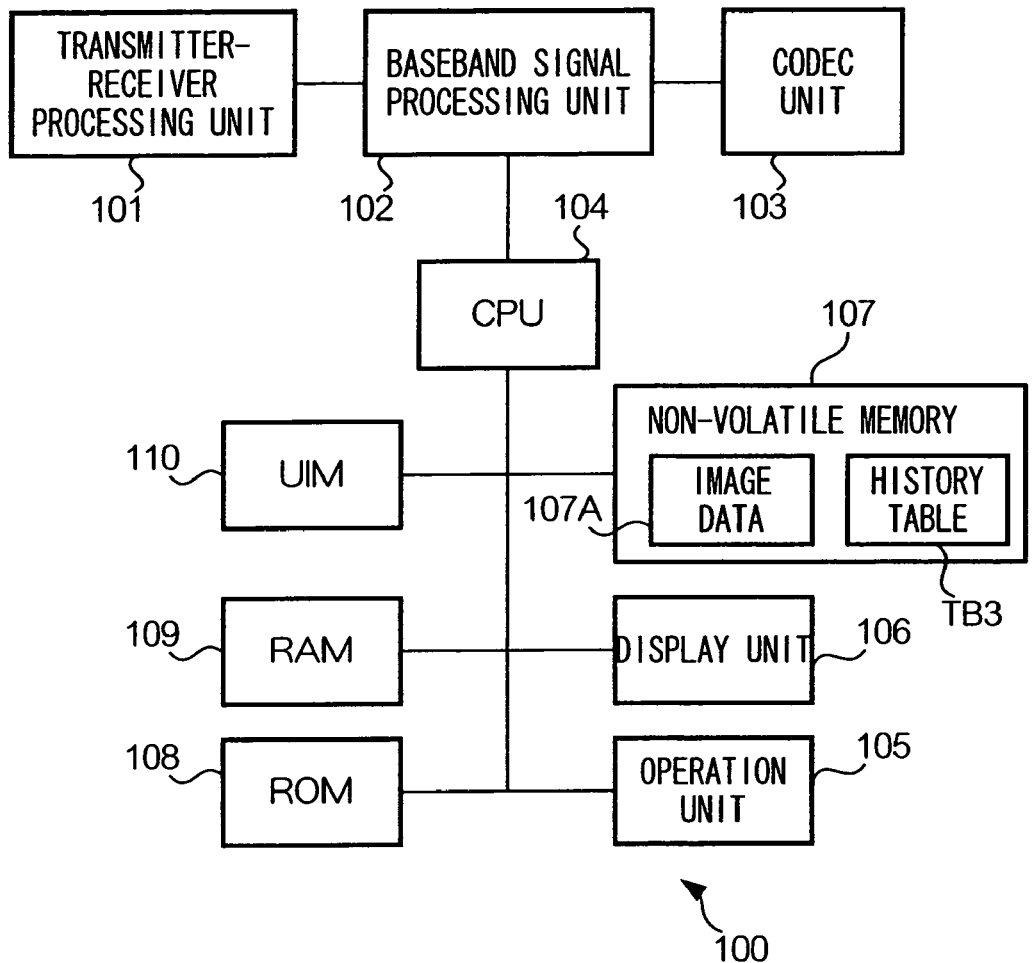
FIG. 4 is a block diagram illustrating a hardware configuration of mobile phone 100 according to the embodiment.
FIG. 5 is a diagram illustrating a history table TB3 stored in mobile phone 100 according to the embodiment.

A configuration of mobile phone 100 will now be explained. FIG. 4 is a diagram illustrating a hardware configuration of mobile phone 100.

Transmitter-receiver processing unit 101 has an antenna (not shown) and performs wireless communication with wireless base station 201. Transmitter-receiver processing unit 101 is connected to base band signal processing unit 102. Transmitter-receiver processing unit 101 amplifies wireless signals sent from wireless base station and provides the signals to base band signal processing unit 102 after demodulation. Transmitter-receiver processing unit 101 is also provided input signals from base band signal processing unit 102. Transmitter-receiver processing unit 101 demodulates the input signals and transmits the signals to wireless base station 201 after demodulation.

Base band signal processing unit 102 is connected to CODEC (COder DECoder) unit 103 and CPU (Central Processing Unit) 104. Base band signal processing unit 102 performs the addition of error-correcting code or diffusion modulation on signals to be transmitted. Base band signal processing unit 102 performs the above processes for signals relating to voice communication provided from CODEC UNIT 103 and for signals relating to data communication provided from data communication. Base band signal processing unit 102 performs back diffusion or error-correcting decoding for signals provided from transmitter-receiver processing unit 101. Base band signal processing unit 102 processes signals provided from transmitter-receiver processing unit 101, provides signals relating to voice communication to CODEC UNIT 103, and provides signals relating to data communication to CPU 104.

CODEC UNIT 103 converts analogue signals into digital signals, or converts digital signals into analogue signals. CODEC UNIT 103 converts analogue signals input from a mike (not shown in the figure) into digital signals and provides the digital signals to base band signal processing unit 102. CODEC UNIT 103 converts digital signals provided from base band signal processing unit 102 into analogue signals and generates a sound including notification sound or voice by providing the analogue signals to a speaker (not shown).

Operation unit 105 has a plurality of keys (not shown), which may be a numeric keypad. When a user of mobile phone 100 presses a key of operation unit 105, a signal representing the pressed key is outputted from operation unit 105 to CPU 104. Display unit 106 includes a liquid crystal display and a control circuit for performing display control of liquid crystal display (not shown) and displays on a liquid crystal display a word screen or graphic screen, a menu screen for operating mobile phone 100 under the control of CPU 104.

Non-volatile memory 107 stores data for controlling mobile phone 100 and image data 107A (file name: "aaa.jpg" for displaying the facial image of the user of mobile phone 100 on a liquid crystal display of display unit 106. As illustrated in a format of FIG. 5, non-volatile memory stores history table TB3. History table TB3 is a table for storing the log of data communication performed by using the later described agent application. In history table TB3, as illustrated in FIG. 5, data indicating date/time, and image data sent and received on the basis of a telephone number and data communication which are correspondingly stored in the order of date/time.

UIM (User Identity Module) 110 is issued by communication carrier managing mobile communication network 200 for a subscriber who has signed a subscription contract. UIM 110 stores subscriber information of a subscriber; for example, a telephone number given to a subscriber by a communication carrier. UIM 110 provided in mobile phone 100-1 stores the code "0*0-XXXX-XXXX"; UIM I 10 provided in mobile phone 100-2 stores the code "0*0-YYYY-YYYY". The attachment of UIM 110 to a mobile phone allows mobile phone 100 to perform communication using subscriber information stored in UIM 110. ROM (Read Only Memory) 108 stores, for example, OS software for controlling each unit of mobile phone 100 and a later described agent program.

When an electric current is supplied from a power source (not shown), CPU 104 uses RAM (Random Access Memory) as a work area and reads out OS software from ROM 108 for activation. When OS software is activated, a clock function for clocking date/time is given to CPU 104. CPU 104 clocks date and time, and stores the data indicating the clocked date and time in RAM 109 as frequently as every one second. CPU 104 executes OS software to perform a process in accordance with a signal input in CPU 104. The process includes, for example, in a case that a user of mobile phone 100 presses a key equipped with operation unit 105, CPU 104 identifies the instruction from a user on the basis of a signal output from operation unit 105 and a window displayed on display unit 106 and performs the process that follows the instruction by the user.

When CPU 104 reads out an agent program from ROM 108, an agent application for performing data communication during the establishment of voice communication line is realized. When CPU 104 runs an agent program to establish a voice communication line between mobile phones 100, the mobile phone 100 that has established a voice communication line then establishes a data communication line, and the mobile phones 100 are provided a data transferring function and a function for acquiring information relating to charges for using communication services provided by mobile communication network 200. As a result, mobile phone 100 communicates with accounting server device 206 during a predetermined period of time when the voice communication line is established.

FIG. 6~FIG. 9 show a flowchart illustrating the processing steps performed by CPU 104 during its execution of an agent program.

Figure 6:
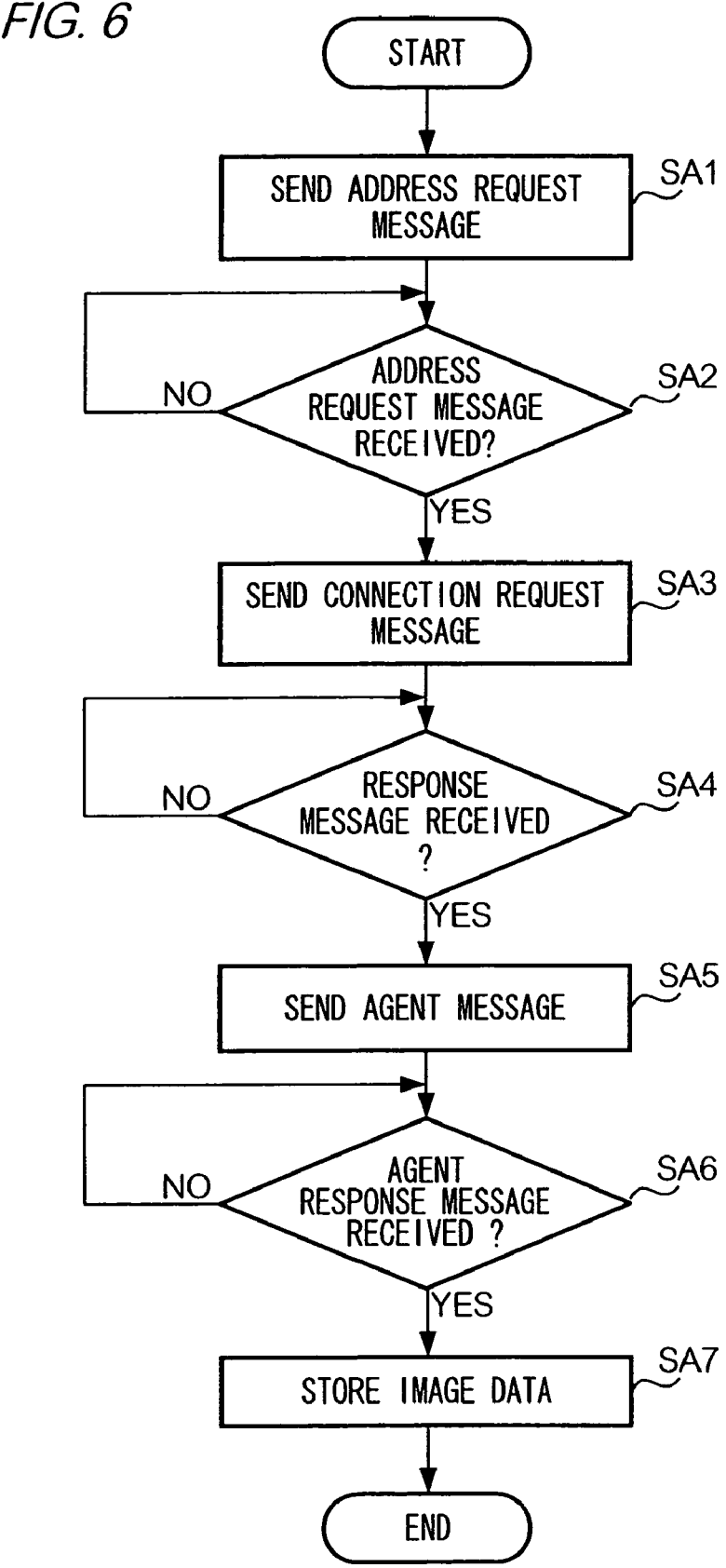
FIG. 6 is a flowchart illustrating the processing steps performed by CPU 104 of mobile phone 100, which originated a call, after a voice communication line is established.

FIG. 6 is a flowchart illustrating processing steps performed by CPU 104 of mobile phone 100 that has originated a call, after a voice communication line is established. As shown in FIG. 6, when a voice communication line is established, CPU 104 establishes a data communication line with mobile phone 100 which is a connection point of a voice communication line, and the CPU stores in history table TB3 image data 107A sent from mobile phone 100, the connection point, using the established data communication line.

Figure 7:
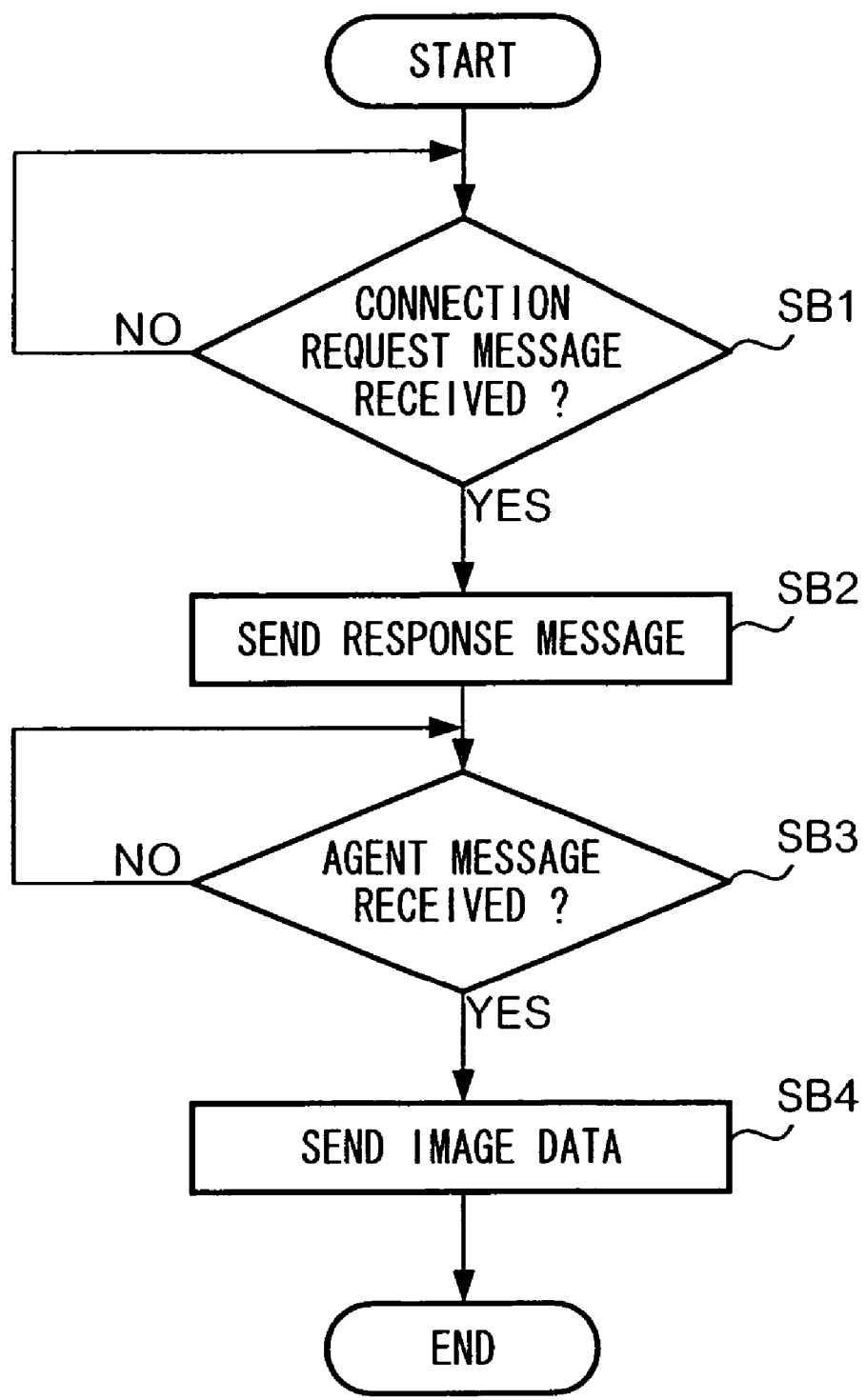
FIG. 7 is a flowchart illustrating the processing steps performed by CPU 104 of mobile phone 100, which has received a call, after a voice communication line is established.

FIG. 7 is a flowchart illustrating the processing steps performed by CPU 104 of mobile phone 100, which receives a call after a voice communication line is established. When a voice communication line is established, CPU 104 establishes a data communication line with mobile phone that has originated a call as illustrated in FIG. 7. In the case that a data communication line is established, CPU 104 receives an agent message transmitted via the established data communication line and sends image data 107A to mobile phone 100 that has transmitted the agent message.

Figure 8:
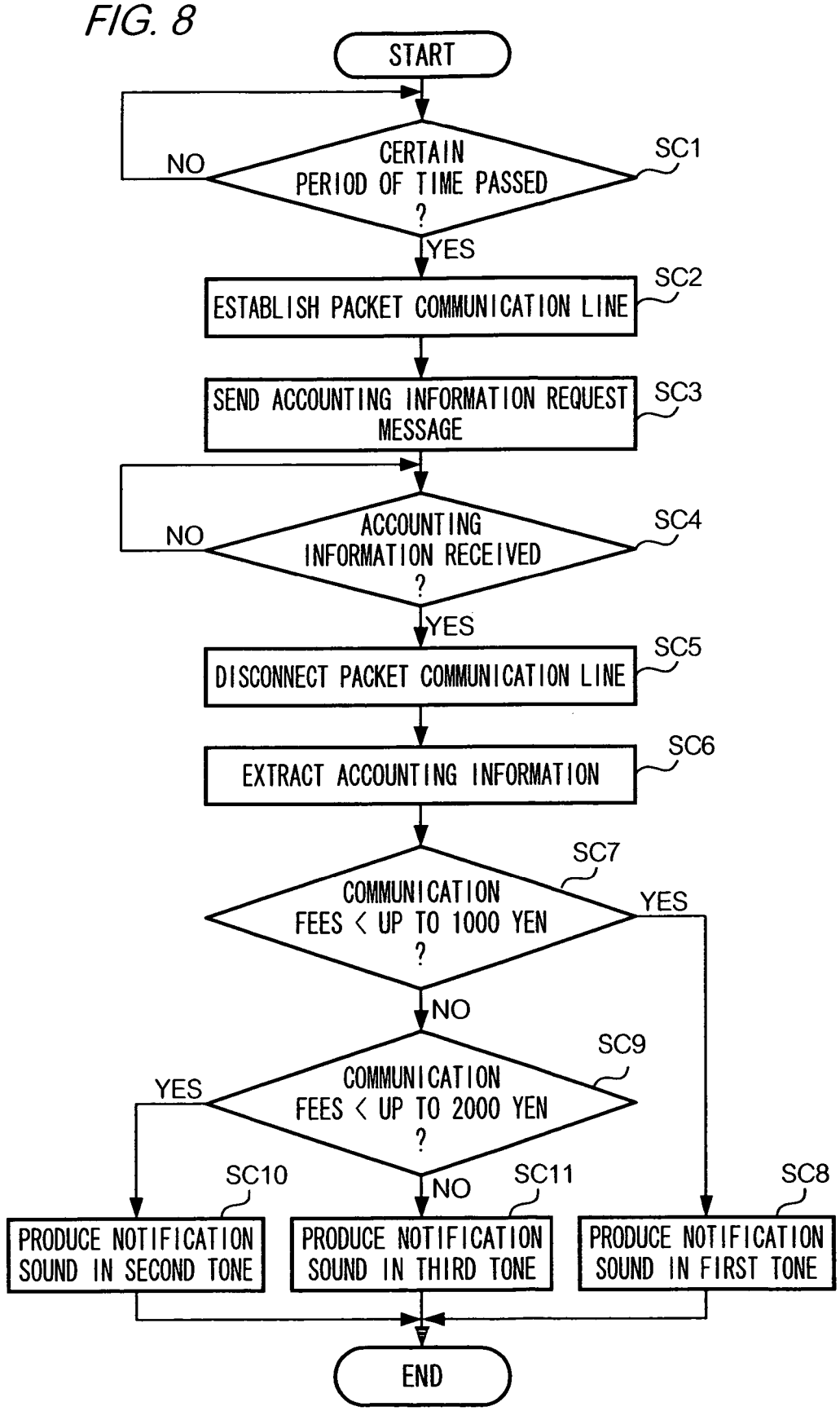
FIG. 8 is a flowchart illustrating the processing steps of acquiring data indicating communication fees performed by CPU 104 of mobile phone 100, which originated a call, while establishing a voice communication line.

FIG. 8 is a flowchart illustrating the processing steps of acquiring data indicating communication fees, performed by CPU 104 of mobile phone 100, which originated a call when a voice communication line is established. CPU 104 then acquires data indicating date/time stored in RAM 109, and after a predetermined period of time passes, acquires data indicating communication fees charged for communications performed by mobile phone 100, and causes a notification sound depending on the fees indicated by the accounting data.

Figure 9:
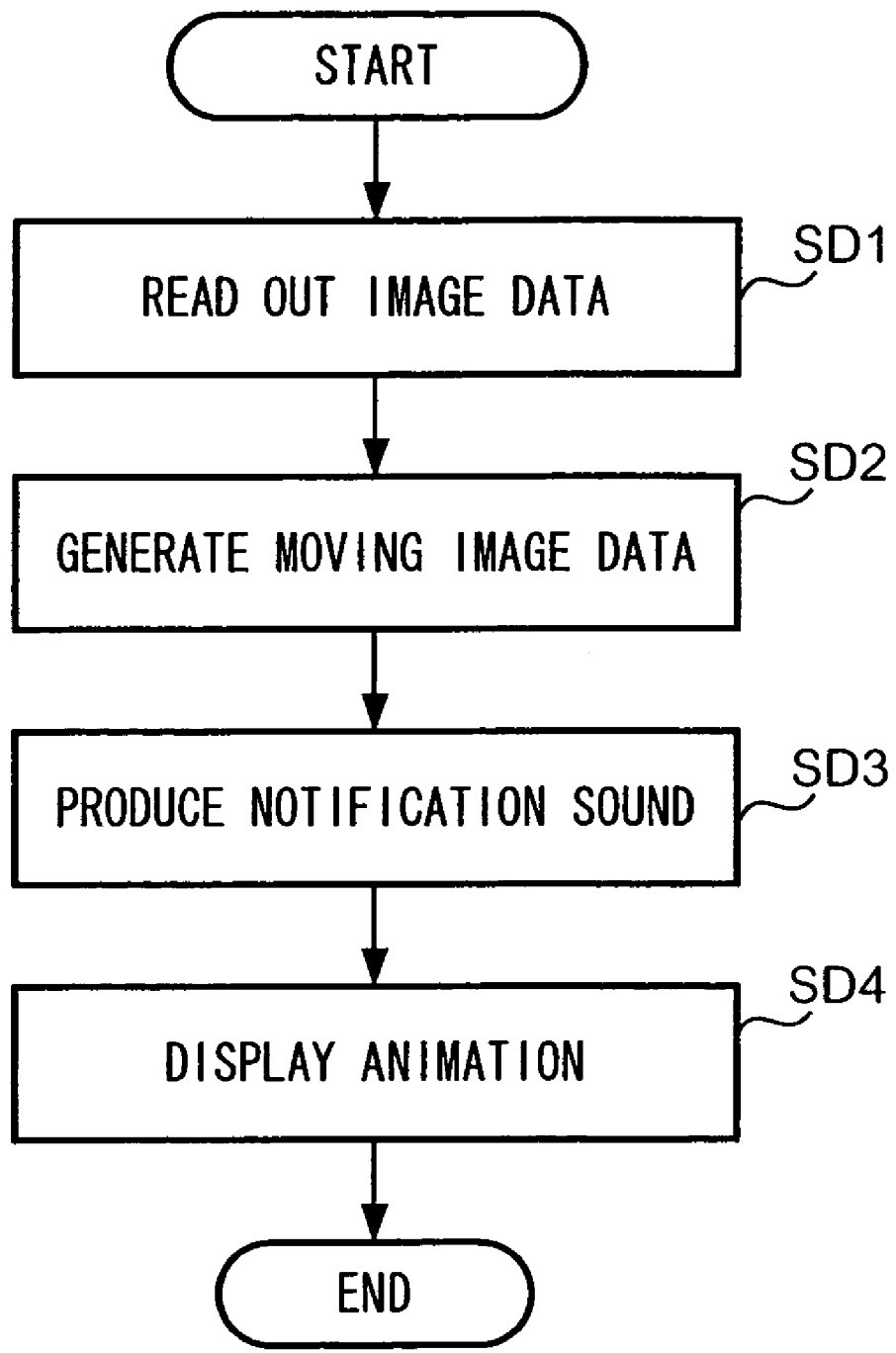
FIG. 9 is a flowchart illustrating the processing steps performed by CPU 104 of mobile phone 100, which originated a call, when a user of mobile phone 100 ends a voice communication and disconnects the voice communication line while establishing voice communication line.

FIG. 9 is a flowchart illustrating the processing steps performed by CPU 104 of mobile phone 100, which originated a call, when a user of mobile phone 100 ends communication and disconnects a voice communication line. When disconnecting the voice communication line, GPU 104 reads out image data from history table TB3 and generates moving image data for displaying an animation picture in which a character receives an image indicating the read image data. CPU 104 controls display unit 106 on the basis of received moving image data and displays on liquid crystal display of display unit 106 an animation picture in which a character receives a facial image.

2. Operation Example

Figure 10:
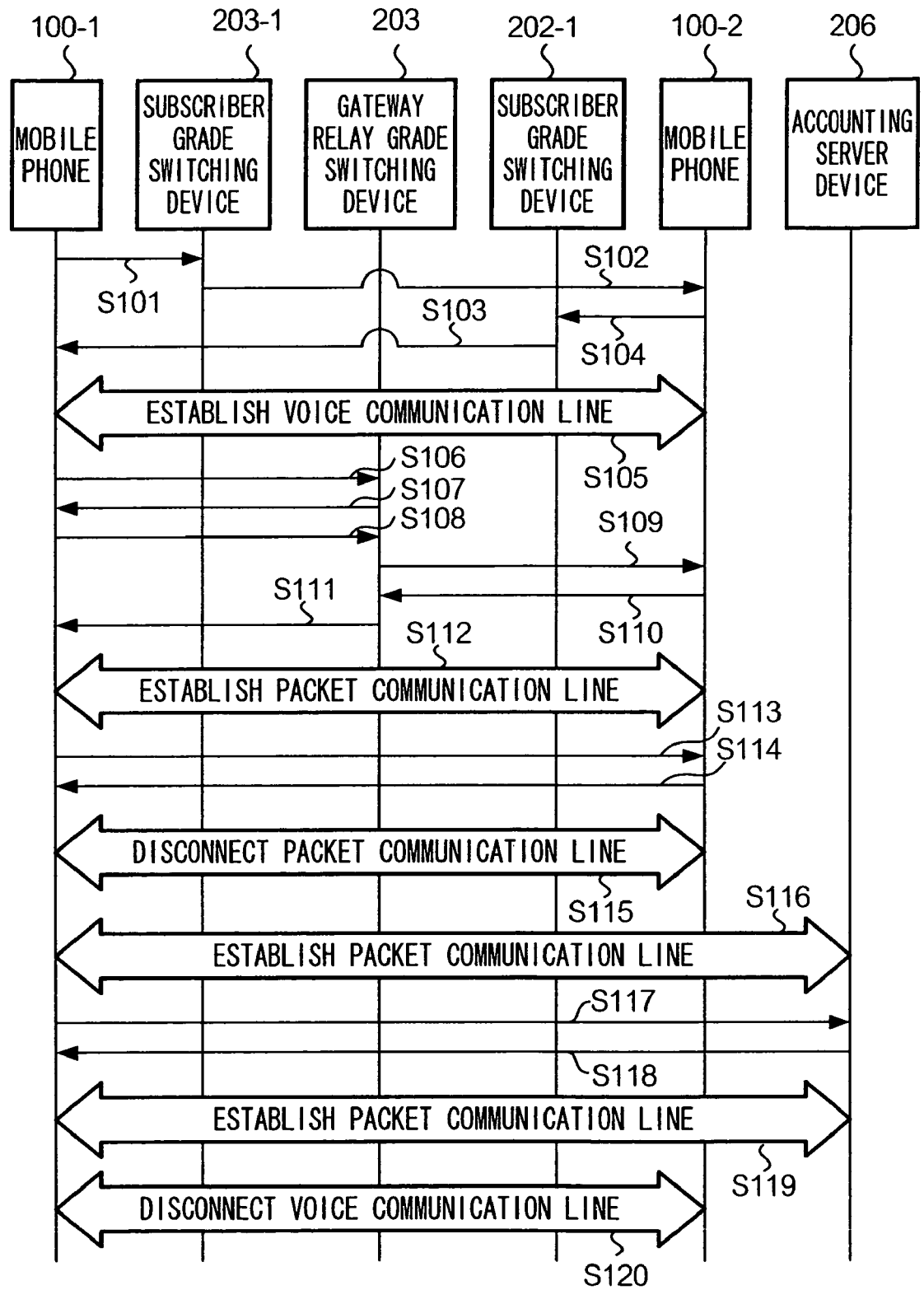
FIG. 10 is a diagram for explaining an operation example according to the embodiment of the present invention.

Referring to FIG. 10, an operation example of the present embodiment will be explained. The operation example explained below describes a case where an agent program is already executed and an agent application is realized in mobile phone 100-1 and mobile phone 100-2.

When the user of mobile phone 100-1 (hereinafter, generically referred to as first user) inputs a telephone number code "0*0-YYYY-YYYY" given to the user of mobile phone 100-2 (hereinafter, generically referred to as second user) using keys equipped with operation unit 105 to instruct the connection of a communication line, CPU 104 stores the input telephone number in RAM 109 and transmits a line connection request message requesting line connection, by controlling base band signal processing unit 102 (step S101). When received in wireless base station 201-1, the message is transmitted to subscriber grade switching device 203-1 via wireless network control device 202. When receiving the connection request message, subscriber grade switching device 203-1 sends an incoming signal to subscriber grade switching device 203-2 via ATM network 210, and the signal is transmitted to mobile phone 100-2 via wireless network control device 202-2 and wireless base station 201-2 (step S102).

When received by transmitter-receiver processing unit 101 of mobile phone 101, the incoming signal is provided to CPU 104 via base band signal processing unit 102. When receiving the incoming signal, CPU 104 controls base band signal processing unit 102 so that a speaker (not shown) connected to CODEC UNIT 103 emits a ringing tone. The control allows a CODEC UNIT 103 connected to base band signal processing unit 102 to emit a ringing tone from a speaker. When a second user uses keys of operation unit 105 to input an instruction for starting communication in response to the ringing tone, CPU 104 generates a ringing response signal. The generated ringing response signal is provided to base band signal processing unit 102, and is provided to transmitter-receiver processing unit 101 for transmission from antenna (not shown) (step S103). The response signal is received in wireless base station 201-2, sent to subscriber grade switching device 203-2, and transmitted to mobile phone 100-1 via ATM network 210, subscriber grade switching device 203-1, wireless network control device 202-1, and wireless base station 201-1 (step S104). When a ringing response signal is received by mobile phone 100-1, a voice communication line is established (step S105); then, the first user and the second user start voice communication.

When a voice communication line is established to perform data communication, CPU 104 of mobile phone 100-1 which is running an agent program generates an address request message including telephone number "0*0-XXX-XXXX" which is a message for requesting the provision of an IP address, and is stored in UIM 110. The address request message is sent from mobile phone 100-1 and received in wireless base station 201-2 (FIG. 6: step SA1, FIG. 10:step S106).

The address request message received in wireless base station 201-1 is sent to gateway relay grade switching device 204. When receiving the address request message, gateway relay grade switching device 204 determines an IP address "xxx.xxx.xxx.xxx" to be given to mobile phone 100-1. Gateway relay grade switching device 204 makes a correspondence between the determined IP address and a telephone number included in the address request message and stores them in address management table TB1, as shown in FIG. 2. Gateway relay grade switching device 204 then generates a response message including the determined IP address. The response message is transmitted to mobile phone 100-1 via subscriber grade switching device 203-1, wireless network control device 202-1, and wireless base station 201-1 (step S107). When receiving the message, CPU 104 of mobile phone 100-1 (step SA2; YES) extracts IP address "xxx.xxx.xxx.xxx" included in the message and stores the address in RAM 109.

Then, CPU 104 of mobile phone 100-1 acquires from RAM 109 a telephone number input by the first user when placing a call. CPU 104 generates a connection request message containing "0*0-YYYY-YYYY", a telephone number acquired from RAM 109, and "xxx.xxx.xxx.xxx", IP address given to mobile phone 100-1, to perform data communication with mobile phone 100-2 designated by the acquired telephone number. The message is sent from mobile phone 100-1 to gateway relay grade switching device 204 (step SA3, step S108).

When receiving the connection request message, gateway relay grade switching device 204 extracts a telephone number included in the message and determines the IP address as "yyy.yyy.yyy.yyy" for mobile phone 100-2 identified by the telephone number. Following the determination of an IP address, gateway relay grade switching device 204 makes a correspondence between the extracted telephone number "0*0-YYYY-YYYY" and the determined IP address "yyy.yyy.yyy.yyy" in address management table TB1, as shown in FIG. 2. Then, gateway relay grade switching device 204 includes the determined IP address in the received connection request and sends the message to mobile phone 100-2 (step S109).

When receiving the connection request message (FIG. 7: step SB1;YES), CPU 104 of mobile phone 100-2 extracts the IP addresses given to mobile phones 100-1 and 100-2 and stores the addresses in RAM 109. CPU 104 generates a connection response message including the extracted IP address of mobile phone 100-1 as its destination and the IP address given to mobile telephone 100-2 as its source. The message is sent from mobile phone 100-2 to gateway relay grade switching device 204 (step SB2, step S110).

When receiving the connection response message, gateway relay grade switching device 204 extracts from the message the IP address of mobile phone 100-1

"xxx.xxx.xxx.xxx", designated as a destination of the message. On the basis of the extracted IP address, gateway relay grade switching device 204 retrieves data stored in address management table TB1 to read out the telephone number "0*0-XXXX-XXXX" stored in correspondence with the IP address. Then, gateway relay grade switching device 204 transmits the received connection response message to mobile phone 100-1 identified by the telephone number (step S111).

When receiving the connection response message (step SA4; YES), CPU 104 of mobile phone 100-1 establishes a packet communication line dedicated for data communication (step S112). When a packet communication line is established, CPU 104 stores in RAM 109 IP address "yyy.yyy.yyy.yyy" given to mobile phone 100-2 and included in the connection response message. The establishment of a packet communication line triggers CPU 104 to generate an agent message for requesting image data 107A; the message including a telephone number stored in UIM 110 and an IP address given to mobile phone 100-2. The agent message is sent from mobile phone 100-1 via the established packet communication line, and is received in mobile phone 100-2 (step SA5, step S113).

When receiving the agent message (step SB3; YES), CPU 104 of mobile phone 100-2 reads out image data 107A from non-volatile memory 107 in response to the message and generates an agent response message including the read image data 107A. The agent message is sent from mobile phone 100-2 via the established packet communication line, and is received in mobile phone 100-1 (step SB4, step S114).

When receiving the agent response message (step SA6; YES), CPU 104 of mobile phone 100-1 acquires from RAM 109 the telephone number input by the first user for placing the call; namely, "0*0-YYYY-YYYY" and the date and time data "2002/10/25 10:00" indicating the current date or time clocked by the clocking function provided as a result of activating OS software. CPU 104 then extracts image data included in the agent response message; and as shown in FIG. 5, makes a correspondence between the data with date/time data and a telephone number acquired from RAM 109 for storage in history table TB3 of non-volatile memory 107 (step SA7). When storing the data in history table TB3, CPU 104 disconnects the packet communication line established between mobile phone 100-2 (step S115).

CPU 104 of mobile phone 100-1, running an agent program, performs packet communication with accounting server device 206 and attempts to acquire information relating to voice communication and data communication.

When a certain period of time passes after the establishment of a voice communication line (FIG. 8: step SC1; YES), CPU establishes a packet communication line between NMSCP 205 (step SC2, step S116). Generates accounting information request message for requesting information relating to a charge for packet communications performed during the voice communication; the message including a telephone number stored in UIM 110, and sends the message to accounting server device 206 using the established packet communication line (step SC3, step S117). When receiving accounting information request message, accounting server device 206 extracts the telephone number "0*0-XXXX-XXXX", included in the message on the basis of the extracted telephone number and retrieves accounting table TB2 illustrated in FIG. 3. In a case that the telephone number is retrieved, accounting server device 206 reads out from accounting table TB2 communication fees data "550 YEN" stored in correspondence with the telephone number and generates an accounting information response message including the read communication fees data. The message is sent to mobile phone 100-1 from accounting server device 206 (step S118).

When receiving the accounting information response message (step SC4; YES), CPU 104 of mobile phone 100-1 disconnects the packet communication line (step SC5, step S119). CPU 104 then extracts communication fees data included in the accounting information response message (step SC6). Following the extracting step, CPU 104 produces a notification sound from a speaker depending on the amount indicated by the extracted communication fees. In this case, the amount that the extracted communication fees indicates is "550 YEN" (step SC7; YES); thus, CPU 104 controls base band signal processing unit 102 so that a speaker connected to CODEC UNIT 103 produces a notification sound in first tone on the basis of the amount indicated by the accounting information (step SC8).

When the first user completes the communication and performs an operation for disconnecting the voice communication line using the keys which operation unit 105 is equipped with, CPU 104 disconnects the voice communication line (step S120). When disconnecting the voice communication line, CPU 104 reads out image data stored last in the order of history table TB3 (FIG. 9: step SD1). CPU 104 then generates moving image data for displaying an animation picture, wherein a character receives a facial image represented by the read image data (step SD2). Then, CPU 104 controls base band signal processing unit 102 so that a speaker connected to CODEC UNIT 103 produces a notification sound (step SD3). On the basis of the generated moving image data, CPU 104 directs display unit 106 to display on a liquid crystal display of display unit 106 an animation picture, wherein the character receives the facial image (step SD4).

According to the present invention, when a voice communication ends, a first user is ensured a notification by a notification sound that mobile phone 100-1 has received data using data communication. Also, it becomes possible to perform data communication between terminals belonging to persons engaged in business communication and data communication between an individual and his/her friends. Furthermore, by using a data communication application that notifies send/receive data using an animation picture to a user of a mobile phone, it is possible to increase the entertainment value in data communication. The increase in entertainment value encourages communication between users, which leads to greater use of communication or data communication using a communication terminal. Since an animation picture is displayed using the received data, the application explained in the above described embodiment also allows the timely use of received data. Data communication performed between mobile phone 100 and accounting server device 206 during communication enables a first user to receive information on communication fees while carrying out communication. As explained above, the present embodiment ensures that the user of mobile phone 100 during or after his/her communication, acquires data as a result of data communication performed during communication.

3. Modifications

The present invention is not limited to the present embodiment. Modifications of the above described embodiment will next be described.

The notification of accounting information is not limited to using a notification sound; the notification may include several methods including a notification by oscillation, image display on a display screen, a flashing of LED.

In the above described embodiment, an agent program is activated by a user of mobile phone 100 before the connection of voice communication line; in another embodiment, however, an agent program may automatically activated at the time that a voice communication line is connected, or an agent AP may be activated in response to a connection request message sent from gateway relay grade switching device 204.

Data sent/received in data communication performed during voice communication is not limited to the image data illustrated in the above described embodiment; both the data indicating the time that a voice communication started and the telephone number may be sent to a mobile phone, a connection point of a communication line. In a preferred embodiment, the data indicating the time may be registered with a schedule data included in an application managing a schedule such as PIM (Personal Information Manager). In view of the foregoing embodiment, it is possible to keep data of a communication party in a mobile phone as a history. In a preferred embodiment, with a clocking function, a communication time may be clocked and sent at the time of completion of the communication. According to the embodiment, it is possible to keep a history of a communication time and a history regarding with whom and how long the communication was performed.

In the above described embodiment, an agent program is stored in ROM 108; in another embodiment, however, the program may be stored in non-volatile memory 107. An agent program may also be downloaded from a server device connected to the Internet. In a preferred embodiment, an agent program may be stored in a storage medium including CD-ROM or FD for delivery. By allowing an agent program to be delivered in this way, it is possible to install an agent program in mobile phone 100 having no agent program, and to upgrade the agent program.

A notification sound or a melody may produce a different sound at the time of disconnecting a voice communication line, depending on the communication fees at the time of disconnection of the voice communication line.

Mobile phone 100 may notify a user of mobile phone 100 when data reception starts and data reception is completed. In view of the foregoing embodiment, in a case that time is required for starting and completing communication, in a data communication conforming to a FTP (File Transfer Protocol), for example, and mobile phone 100 receives data of large size, a user of mobile phone 100 is informed of the outline of sending/receiving data size while communication.

In recent times, some mobile phones are capable of running an application software prepared using Java (trademark) language. This type of mobile phone is provided with a runtime environment software for realizing runtime environment prepared by Java language; and by activating the software, it is possible to activate an application program prepared by Java language.

In this type of mobile phone, an agent program prepared by Java language may be executed on Java runtime environment realized by activating runtime environment software.

An agent program prepared by Java language may use programs included in a class library to realize a function for sending/receiving data after establishing a data communication line with a connection point of a communication line, and a function for sending/receiving data after establishing a data communication line with accounting server device 206; wherein, Java runtime environment software is provided with a class library including a program for realizing the function of sending/receiving data after establishing a data communication line with a connection point of a communication line and a program for realizing the function of sending/receiving data sending/receiving data after establishing a data communication line with an accounting server device.

In the above described embodiment, CPU 104 activates an agent program and realizes both functions: the function for establishing a data communication line with a connection point of communication line and the function for sending/receiving data after establishing a data communication line with accounting server device 206. In another embodiment, however, an agent program may be a program for realizing either one of a program.

The invention claimed is:

1. A communication terminal for performing at least partly simultaneous voice communication and data communication with a correspondent terminal, comprising:
   a first communication controller that establishes a circuit-switching communication line to the correspondent node;
   a second communication controller that establishes a packet-switching communication line to the correspondent node, wherein the communication terminal uses packet-switching communication via the packet-switching communication line at least partly concurrently with communicating via the circuit-switching communication line;
   data sending-receiving unit that sends and receives data using the packet-switching communication line established by the second communication controller; and
   notifying unit configured to notify that the data sending-receiving unit has received data while performing the circuit-switching communication,
   wherein the second communication controller establishes the packet-switching communication by:
      sending a connection request message to a gateway apparatus, the connection request message including subscriber information of the correspondent node,
      receiving a connection response message from the gateway apparatus, the connection response message including a data communication address of the correspondent node, and
      establishing the packet communication line dedicated to data communication to the correspondent node.

2. A communication terminal for performing at least partly simultaneous voice communication and data communication with a correspondent terminal, comprising:
   a first communication controller that establishes a circuit-switching communication line to the correspondent node;
   a second communication controller that establishes a packet-switching communication line to an accounting server device storing information on charges for the use of at least the circuit-switching communication line established by the terminal, wherein the communication terminal uses packet-switching communication via the packet-switching communication line at least partly concurrently with communicating via the circuit-switching communication line;
   data sending-receiving unit that sends and receives data using the packet-switching communication line established by the second communication controller; and
   notifying unit configured to notify that said data sending-receiving unit has received data while performing the circuit-switching communication,
   wherein the second communication controller establishes the packet-switching communication by:
      sending a connection request message to a gateway apparatus, the connection request message including subscriber information of the correspondent node, receiving a connection response message from the gateway apparatus, the connection response message including a data communication address of the correspondent node, and establishing the packet communication line dedicated to data communication to the correspondent node.

3. A communication terminal described in claim 1 or claim 2 wherein said notifying unit notifies the sending and receiving by said data sending-receiving unit while establishing a voice communication line.

4. A communication terminal described in claim 1 or claim 2 wherein said notifying unit notifies that said data sending-receiving unit starts receiving data and that said data sending-receiving unit completes receiving data.

5. A communication terminal described in claim 1 or claim 2 wherein said notifying unit, triggered by the disconnection of voice communication line, notifies that said data sending-receiving unit sends and receives data.

6. A communication terminal described in claim 5, wherein said notifying unit notifies by an image that said data sending-receiving unit sends and receives data.

7. A communication terminal described in claim 1 or claim 2; further comprising clocking unit for clocking a time of communication performed by said communication line, wherein said data sending-receiving unit sends and receives time data clocked by said clocking unit.

8. A communication terminal described in claim 1, wherein the circuit-switching communication line is used for voice communication.

9. A communication terminal described in claim 1, wherein the communication terminal comprises a mobile terminal.

10. A communication terminal described in claim 1, wherein the notifying using the notifying unit is selected from the group consisting of emitting a sound, generating an oscillation, displaying on a display screen, and flashing an LED.

11. A communication terminal described in claim 2, wherein the circuit-switching communication line is used for voice communication.

12. A communication terminal described in claim 2, wherein the communication terminal comprises a mobile terminal.

13. A communication terminal described in claim 2, wherein the notifying using the notifying unit is selected from the group consisting of emitting a sound, generating an oscillation, displaying on a display screen, and flashing an LED.

14. A computer-readable medium storing a program for causing a computer to provide the functions of:
    establishing a circuit-switching communication via a first communication line in order to communicate to a correspondent node;
    establishing a second communication line with the correspondent node in order to communicate via a packet-switching communication with the correspondent node, wherein the packet-switching communication via the second communication line is at least partly concurrent with the circuit-switching communication via the first communication line;
    sending and receiving data using the packet-switching communication via the second communication line; and
    notifying that said data has been received during the circuit-switching communication via the first communication line,
    wherein the packet-switching communication is established by:
        sending a connection request message to a gateway apparatus, the connection request message including subscriber information of the correspondent node,
        receiving a connection response message from the gateway apparatus, the connection response message including a data communication address of the correspondent node, and
        establishing the packet communication line dedicated to data communication to the correspondent node.

15. A program described in claim 14, wherein the first communication line is used for voice communication.

16. A program described in claim 14, wherein notifying is selected from the group consisting of emitting a sound, generating an oscillation, displaying on a display screen, and flashing an LED.

17. A computer-readable medium storing a program for causing a computer to provide the functions of:
    establishing a circuit-switching communication via a first communication line in order to communicate to a correspondent node;
    establishing a second communication line in order to communicate via a packet-switching communication with an accounting server device storing information charges wherein the packet-switching communication via the second communication line is at least partly concurrent with the circuit-switching communication via the first communication line;
    acquiring information of said charges from said accounting server device using the packet-switching communication via the second communication line; and
    notifying that said data has been received during the circuit-switching communication via the first communication line,
    wherein the packet-switching communication is established by:
        sending a connection request message to a gateway apparatus, the connection request message including subscriber information of the correspondent node,
        receiving a connection response message from the gateway apparatus, the connection response message including a data communication address of the correspondent node, and
        establishing the packet communication line dedicated to data communication to the correspondent node.

18. A program described in claim 17, wherein the first communication line is used for voice communication.

19. A program described in claim 17, wherein notifying is selected from the group consisting of emitting a sound, generating an oscillation, displaying on a display screen, and flashing an LED.

* * * * *